US006931542B1

(12) United States Patent
Gregoire

(10) Patent No.: US 6,931,542 B1
(45) Date of Patent: Aug. 16, 2005

(54) METHOD FOR VERIFYING THE EXECUTION OF A SOFTWARE PRODUCT

(75) Inventor: Louis Gregoire, Cassis (FR)

(73) Assignee: Gemplus, Gemenos Cedex (FR)

(*) Notice: Subject to any disclaimer, the term of this patent is extended or adjusted under 35 U.S.C. 154(b) by 0 days.

(21) Appl. No.: 09/719,432

(22) PCT Filed: Jun. 12, 1999

(86) PCT No.: PCT/FR98/01226

§ 371 (c)(1),
(2), (4) Date: Feb. 16, 2001

(87) PCT Pub. No.: WO99/66387

PCT Pub. Date: Dec. 23, 1999

(30) Foreign Application Priority Data

Apr. 16, 1997 (FR) .................................. 97 05328

(51) Int. Cl.[7] ............................................. G06F 12/14

(52) U.S. Cl. ....................... 713/193; 713/194; 713/201

(58) Field of Search ............................. 713/193, 194, 713/201; 380/201

(56) References Cited

U.S. PATENT DOCUMENTS 6,182,205 B1 * 1/2001 Le Roux et al. .............. 712/38

FOREIGN PATENT DOCUMENTS

BE 1009122 A 12/1996
EP 0191162 8/1986

(Continued)

OTHER PUBLICATIONS

T. Mashita, JP 08-044553 A, "System for Software Having Open Part and Secret Part Provided for Plural Users," Feb. 16, 1996, Japan Patent Office, Computer Translation into English. Retrieved from the Internet:<URL: http://www.ip-dl.jpo.go.jp/homepag_e.ipdl>.*

Ferreira, R.C., "*The Smart Card: A High Security Tool in EDP*", Phillips Telecommunication Review, vol. 47, No. 3, Sep. 1, 1989, pps. 1-19.

(Continued)

*Primary Examiner*—Justin T. Darrow
(74) *Attorney, Agent, or Firm*—Burns, Doane, Swecker & Mathis, LLP

(57) ABSTRACT

The present invention relates to a method for verifying the execution of a computer program, comprising the following steps: 1) a program is split up into at least two parts, one public and one secret, whereby the public part is executed on a first processing means and the second part is executed on a second secure processing means; 2) the public part is placed in a memory pertaining to the first processing means; 3) the secret part is placed on a secure support pertaining to the second processing means in order to be connected to the first processing means; 4) the following operations are performed so that the program can be executed by the first processing means: a) the second processing means is connected to the first and parameters and variables that are a function of external signals triggered by a user are transmitted from the first processing means to the second, b) at least one part of the program is executed by the second processing means, implementing a certain number of received parameters/variables, c) the results of the execution as described in b) are transmitted from the second processing means to the first, d) a certain number of said results are used in the execution performed by the first means. The invention is characterized in that the second means is a portable and detachable auxiliary support which is provided with a chip.

12 Claims, 1 Drawing Sheet

FOREIGN PATENT DOCUMENTS

| | | |
|---|---|---|
| EP | 0268138 | 5/1988 |
| FR | 2762417 | 10/1998 |
| JP | 08-044553 A * | 2/1996 ............. G06F 9/06 |
| WO | WO97/04412 | 2/1997 |
| WO | WO 9704412 A2 * | 2/1997 |

OTHER PUBLICATIONS

Keul, M., "'Dongles': Hardware schutzt Software", Elektronik, vol. 39, No. 10, May 11, 1990, pps. 82-84, 86.

* cited by examiner

METHOD FOR VERIFYING THE EXECUTION OF A SOFTWARE PRODUCT

This disclosure is based upon, and claims priority from International Application No. PCT/FR98/01226, filed Jun. 12, 1999, the contents of which are incorporated herein by reference.

BACKGROUND OF THE INVENTION

The present invention relates to the field of the protection of software products against piracy. It has as its object a process of controlling the execution of a software product.

A software product is understood to mean any program and/or data intended to be processed or executed by a central processing unit, particularly the microcomputer of a personal computer (PC). Software products can be recorded on any medium such as a diskette, hard disk, CD-ROM compact optical disk, or stored on any medium such as a ROM or EPROM type memory.

Computer programs or software products, particularly for a PC, are more and more copied and used without authorization. This is accentuated by the possibility of disseminating the copy on a large scale over networks of servers or to copy it by a mass production of CD-ROMs on which the software is recorded. Simple illegal copies which can be produced on a hard disk or on microcomputer diskettes within the same company are also known.

Among the solutions for preventing illegal use of software products, a system is known for controlling the distribution of computer programs. The program is recorded on its medium in a coded form, and it is then decoded before loading on the computer by the authorized user. For this purpose, the authorized user has means permitting decoding. This process has the advantage of preventing the copying of the medium containing the program, but it has the disadvantage of not preventing the copying of the program from the PC.

A process for controlling the execution of the program is likewise known. It consists of putting into effect a procedure which permits the verification of the presence of a secure device connected to the serial port of the PC, in particular, or to a printer port, this device proving by its presence that the user is authorized to use the program. The presence and authenticity of the device is verified during the execution of the program, continuing the execution of the program being dependent on the verification. This process has the disadvantage that it can be by-passed by skipping the instructions corresponding to this verification.

A process for controlling the use of a microcomputer by an authorized person, and thus indirectly of any program contained within it, is likewise known. It uses a chip card with a microcircuit, commonly known as a "smart card". In this process, a PC is connected via a suitable interface to the smart card, contains a secret authorization code. The authorized user has to key in the access code, which is compared with that stored in the smart card. If the codes correspond, access to the computer or to data or to a computer program is authorized.

This process has the disadvantage of not being able to directly protect the medium before it is loaded into the computer. The medium can therefore be copied.

In the following description, there is understood by "smart card", any accessory type of chip medium which is detachable and portable, and which comprises at least one security module containing a microprocessor and a memory space suitable for containing secret data such as a secret key, as well as secret programs. In particular, a module is concerned which can be inserted into an input/output port of a computer; preferably, it is a card of standardized form, a chip card, or a mini chip card.

SUMMARY OF THE INVENTION

The present invention has as its object to provide a solution to the problem of piracy which is more effective than the present solutions.

The solution provided by the invention likewise relates to the field of control of the execution of a computer program. Execution is controlled because it is solely permitted to persons who have purchased a right of utilization. This right is brought into effect by a secure means or accessory, particularly a smart card according to an example of the invention. By this means, any copying or diffusion of the program is deterred.

For this purpose, the invention firstly has as its object a process of control of the execution of a computer program. According to a first mode, it comprises the following steps, consisting of:

(1) Splitting a program into at least two parts, respectively public and secret, the public part being suitable for execution on a first processing means, and the secret part being suitable for execution on a secure, second processing means.

(2) Placing the public part in a memory of the first processing means.

(3) Placing the secret part on a secure medium of the second processing means intended to be connected to the first processing means.

(4) Carrying out the following operations for the execution of the program by the first processing means:

(a) connecting the second processing means to the first, and transmission, from the first processing means to the second, of parameters/variables which are functions of external signals initiated by a user, (b) execution of at least a portion of the program by the second processing means, putting into effect a certain number of the received parameters/variables, (c) transmission of the results of the execution of the preceding paragraph (b) from the second processing means to the first, (d) using a certain number of the results in the execution effected by the first means.

It is characterized in that the second means is a portable and detachable accessory chip medium.

According to another embodiment, the process comprises the following steps consisting of:

(1) Splitting a program into at least two parts, respectively public and secret, the public part being suitable for execution on a first processing means, and the secret part being suitable for execution on a secure, second processing means.

(2) Encoding at least a secret part and placing it with the public part on the same medium, the latter being intended to be connected to the first processing means.

(3) Placing a corresponding decoding function in the second processing means.

(4) Carrying out the following operations for the execution of the program:

(a) connecting the second processing means to the first, and transmission, from the first processing means to the second, of all or a portion of the coded secret part, (b) decoding the coded secret part received by the second, secure processing means by making use of the decoding function, and storing the decoded secret part in secure memory, (c) transmission from the first processing means to the second of parameters/variables which are functions of external signals, (d) execution of at least a secret portion by the second, secure processing means, using a certain number of the received parameters/variables, (e) transmission of the results of the execution of the preceding paragraph (d) from the second processing means to the first, (f) using a certain number of the results in the execution effected by the first means.

It is characterized in that the second means is a portable and detachable accessory chip medium.

According to a characteristic of implementation of the second variant, in the operation (a) a portion of the coded program is transmitted to the extent needed and/or as a function of the capacity of the secure, second processing means.

Due to this characteristic, a coded program can be executed which has a size greater than the memory capacity of the second processing means. This makes it possible to have recourse to easily manipulated, discrete portable media of the type with a chip, which are generally excluded as the second processing means because of their small capacity.

BRIEF DESCRIPTION OF THE DRAWINGS

The invention will be better understood on reading the description of the two modes of embodiment of the process illustrated in the accompanying drawings, in which.

DETAILED DESCRIPTION

Figure 1:
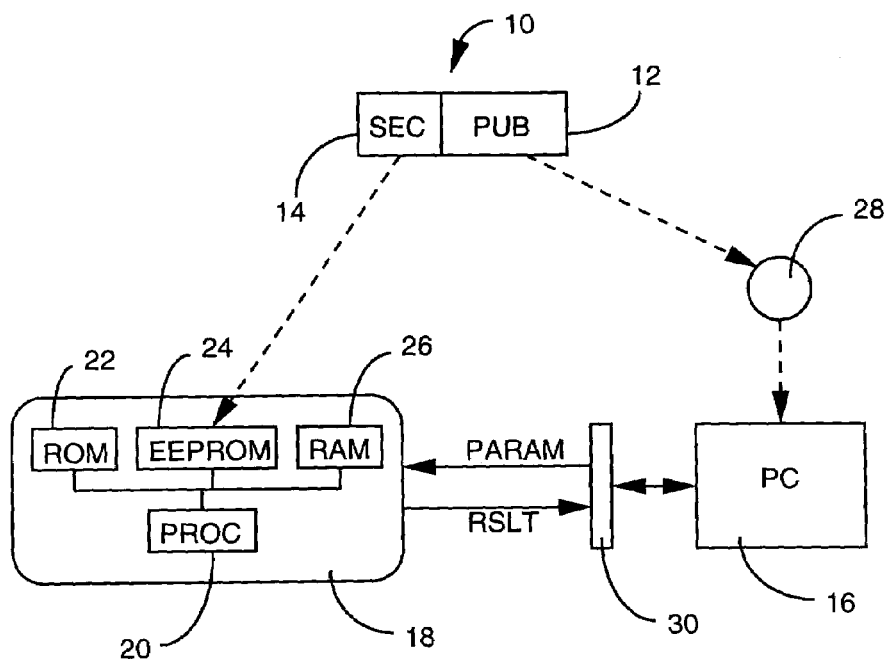
FIG. 1 is a block diagram representation of a first embodiment of the invention.

Embodiments of the invention will be described hereinafter in connection with an example of a computer program. The program taken as an example is a word processing program.

To put the process into effect, it is necessary to split the word processing program 10 into at least two parts, respectively public 12 and secret 14. The public part is capable of being executed on a first processing means, while the secret part is capable of being executed on a second, secure processing means. They can thus appropriately undergo a compilation which is distinct for each.

The first part, termed public, is executable on a microcomputer (PC) operating system 16, taken as the first processing means in the example.

The second part, termed secret, is executable on a secure circuit of a chip card 18, taken as the second processing means in the example. The secure circuit comprises an 8-bit processor 20, a ROM permanent memory 22 containing the operating system of the card, and a non-volatile EEPROM type memory 24 and a RAM type volatile working memory 26. The circuit can be, for example, the circuit of a smart card.

During the storage of the word processing program on a medium intended to be distributed commercially, the program is distributed on distinct storage or recording media. For this, in the example, the public part is disposed on an optical disk (CD-ROM) 28, while the secret part is disposed in the EEPROM memory 24 of the chip card. As the physical medium for the program, in this case, two elements are thus necessary: the optical disk 28 and an associated chip card 18. In the example, the function of calculating the cursor position on the screen of a PC has been chosen to constitute the secret part. This function is lacking on the optical disk and is present solely on the chip card.

For the execution of the program, the PC is connected to the chip card by an interface so as to permit bidirectional communication between them. The public program of the optical disk is loaded into the PC by reading the optical disk. The chip card can for example be connected to the PC via a chip card reader 30 which is itself connected to an input/output port of the PC.

In the course of execution according to the invention, the following operations or steps are effected.

Parameters/variables PARAM which are functions of external signals are transmitted from the first processing means to the second.

In a general manner, "external signals" means information or events which can be different for each utilization of the program. The security of the system is even better ensured when the set of information communicated to the card differs for each utilization. It is likewise even better ensured when the program on the chip card is complex because it comprises, for example, very numerous possible outputs and because there is a sophisticated relationship between the inputs and the outputs.

In the sense of the present invention, the actions initiated by the user via a mouse, keyboard or other input peripheral can for example constitute external signals.

In the example, it is the central processing unit of the PC which transmits to the card, via the interface, the data which correspond to keys of the keyboard actuated by the user. The central processing unit carries out this transmission by executing the public program and the functions of the operating system. For this purpose, the public program contains the instructions necessary for this transmission.

According to a following step of the process, at least a portion of the program is executed by the second, secure processing means, making use of a certain number of the received parameters/variables. This implies that the output of the execution of this part of the program will strongly depend on the value or nature of the parameters/variables which are made use of or which are taken into account by the second processing means for the execution of the secret program.

In the example, when the user strikes the keys of the keyboard, the card then executes the calculation of the cursor position in a line of text on the screen and sends the result RSLT, in this case the value of this position, back to the PC, according to another step of the process.

Then, according to the process, the above results can be used as they are, or preferably a certain number of the above results can be taken into account or used in the execution effected by the first processing means. In the example, the central processing unit of the PC executes the public part of the program to display the position of the cursor on the screen.

It will be seen that the user cannot utilize the cursor function of word processing in the absence of the card. Any illegal copying of the word processing software is deterred by this means, since the software is unusable without the card. It will be understood that, due to the invention, the above deterrence will be more effective, the more the secret part corresponds to an essential part of the program.

Figure 2:
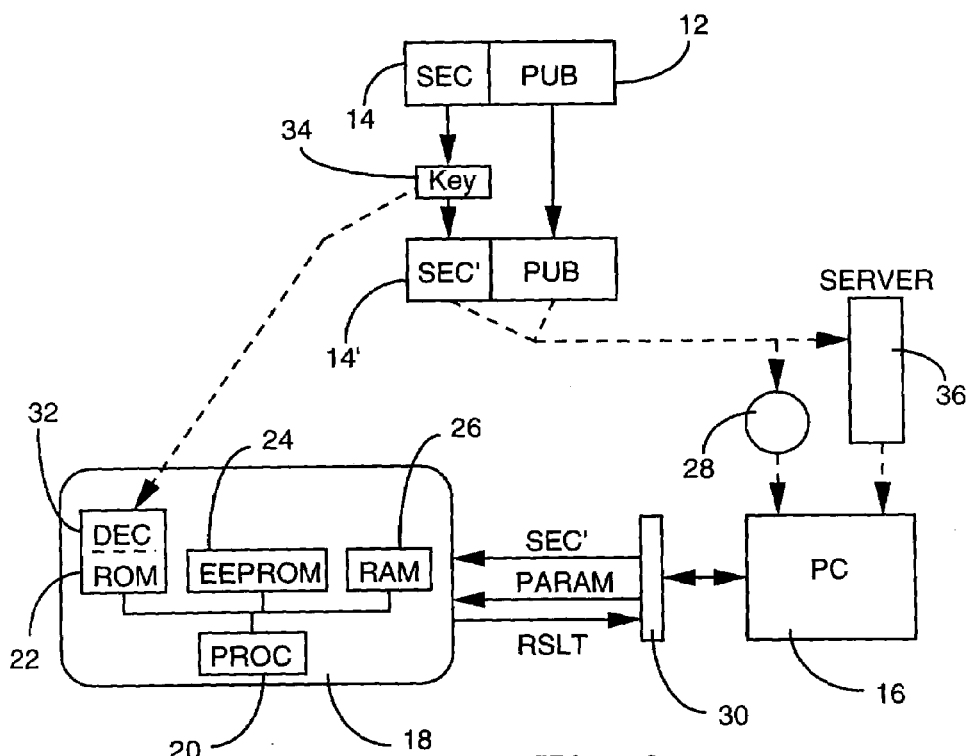
FIG. 2 is a block diagram representation of a second embodiment of the invention.

Another mode of embodiment of the process of the invention will now be described, with reference to FIG. 2.

The system required for the implementation of the process is identical to that described hereinabove, with the following differences.

The secret part 14 is disposed in encoded form 14' on the optical disk with the public part 12, instead of being disposed in the chip card.

The ROM memory of the chip card contains, besides the operating system, a function 32 for decoding and for loading the decoded program into its RAM memory.

During the execution of the program according to the invention, the following operations or steps are carried out.

All or a portion of the encoded program 14' is transmitted from the first processing means to the second.

In the example, it is the function of calculating the cursor position which is encoded. This is transmitted encoded by the word processing program to the chip card, for example on starting the program. It can likewise be transmitted only at the instant when it becomes necessary. For this purpose, the word processing program likewise includes information permitting the position to be localized, particularly its address or its filename.

According to the process, the encoded secret part received by the second, secure processing means is decoded by implementing the decoding function, and the decoded secret part is stored in secure memory.

In the example, the chip card decodes the function of calculating the cursor position by implementing its decoding function, and stores the function concerned in an executable form.

It will be seen in this example that the process implements a system comprising a smart card which is capable of loading all or a portion of the coded program, decoding with a secret key 34 from the software publisher, receiving calls from the first means and transmitting them for the executable program which has been loaded beforehand, and returning the results to the first processing means.

The public executable program includes supplementary instructions for transmitting portions of secret program to the card, via the input/output functions of the operating system of the card or possibly via those of the operating system of the PC, and instructions for calls to functions loaded on the card.

By extension of the possible applications of the process of the invention, the decoder of the second processing means can be in a hardwired form on a memory card, in order to reduce the cost of the accessory.

As for the first processing means, it is generally a central processing unit of a personal computer.

Advantageously, before loading the public part onto the first processing means such as a PC, the public part can be disposed on a server 36 or a database to which the central processing unit of the first means can be connected. The public part of a program or software product can likewise be disposed on a network, particularly of the Internet type, to which the first processing means can be connected as the user wishes.

Thus, for a potential purchaser of a software product, it is sufficient to search the software accessible on the network such as the Internet, and to load it into the memory of his PC. In parallel, the purchaser can receive the card containing the secret part, in particular by mail.

Although the software is available to everyone on the Internet network, it can only be used if the user has the accessory, particularly in the form of a card having a microprocessor.

Thus, by this means, the invention permits the software publisher to free himself from the copying of these last on a physical medium such as a diskette. The invention likewise dispenses with the physical distribution of the software.

Accompanying the executable software placed on the Internet, it is possible to add data such as the contents of a user's manual for the software.

Process of Distribution of Rights:

The invention described hereinabove enables the distribution of the software itself to be separated from the distribution of the rights of utilization. The software can be freely copied by users and/or placed at their disposal on a local or distant server, without restriction of access. This is the case for the public part as well as for the secret part in the case that this has been encoded, as described in the second variant. On the other hand, the distribution of the rights has to be secured to ensure that the use of the software is only granted after payment.

In the first variant described hereinabove, the rights are realized in the form of the secret part of the program stored on the card. Indeed, only those who possess a card with this secret program can use the software. In the second variant, the rights are realized by a secret cryptographic key which enables the second processing means (security module) to decode the secret code which is transmitted to it.

In the two variants which have been described, the rights (secret program or secret key) are loaded into the security module before its distribution. It is likewise possible to distribute these elements to an already distributed card, by means such as a public network (such as the Internet) to which the PC with the user's card is connected, or by the insertion of the card in a point of sale device at a software retailer's. A third means consists of establishing communication between a remote rights distribution server and the utilizing PC via the telephone network by means of a modem. The remote distribution of rights makes it possible to download new rights into a card which already contains rights, for example, for a new item of software whose public program is freely accessible elsewhere, either through a network or from a friend's copy, or for example because the initial CD-ROM (compact optical disk) contains several software products but the user has only purchased the rights to one of them. It also enables the distribution of the cards to be separated from the distribution of rights, which for example permits several software publishers to utilize the protection ensured by the same card. The card which has become neutral can in this case be purchased by an end user from the microcomputer retailer.

To effect the distribution of the key or of the secret program in a secure manner, a first variant of the process is described hereinbelow. It is supposed that the starting card does not contain any rights.

(1) The issuer of the card includes on it, before distribution, and in addition to the elements described hereinabove in the two variants of the invention, a decoding means and a secret key, intended to decode the rights (which in one case are themselves represented by a key). Furthermore, he includes there a unique number (different for each card) which is termed the "identity" of the card.

(2) The issuer of the card places at the disposal of software publisher(s) a decoding means for the rights and its encoding key, for the particular programs of this publisher or these publishers. The encoding key is in this case identical to the decoding key contained in the user's card.

(3) During the purchase of rights, the purchaser places his card in communication with the rights distribution server, which itself is connected to the rights coding means. This can be effected, for example, from the user's home, the office, or at a point of sale for software, via any data communication means such as the Internet network, a modem connection, or the use of the communication means of the networks of mobile telephones equipped with a card reader.

(4) After verification of payment by some means, (not described here but which can make use of a manual transaction with cash or a check to the storekeeper, or an automatic transaction with the same or another remote server, making use of specific payment functions of the operating system of the same or another card), the card sends to the server a request for loading the rights. This request includes an identification of the software product requested, as well as the identity of the card.

(5) The server combines the identity of the card with the rights coding key, for example, by a logical XOR operation, the result being a number of bits suitable for use as the encoding key. This process is termed diversification of the key. The server uses this diversified key to encode the requested rights. It makes it possible to guarantee that the thus encoded rights will only be usable by the card which has requested them, and in particular cannot be loaded onto other cards.

(6) The server sends the thus encoded rights to the purchaser's card.

(7) The purchaser's card effects the same operation combining encoding key and identity to calculate the decoding key. It uses this to decode the rights, and stores them in its non-volatile memory. It then has the means to execute the secret part of the program which has been purchased.

What is claimed is:

1. Process of controlling the execution of a computer program, comprising the following steps:
   (1) Splitting a program into at least two parts, respectively public and secret, the public part being suitable for execution on a first processing means, and the secret part being suitable for execution on a secure, second processing means;
   (2) Placing the public part in a memory of the first processing means;
   (3) Storing the secret part on a non-volatile secure medium of a portable second processing means comprising a chip medium that can be connected to and detached from the first processing means;
   (4) Carrying out the following operations for the execution of the program by the first processing means:
      (a) connecting the second processing means to the first, and transmission, from the first processing means to the second, of parameters/variables which are functions of external signals initiated by a user,
      (b) execution of at least a portion of the program by the second processing means, utilizing said received parameters/variables,
      (c) transmission of the results of the execution of the preceding paragraph (b) from the second processing means to the first, and
      (d) using said results in the execution effected by the first means.

2. Process according to claim 1, wherein the second processing means is a card having a microprocessor.

3. Process according to claim 1, wherein the second processing means is in a hardwired form on a memory card.

4. Process according to claim 1, wherein the first processing means is a central processing unit of a computer.

5. Process according to claim 4, wherein the central processing unit is connected to a network, on which at least the public part of the program is available on demand.

6. Process of controlling the execution of a computer program, comprising the following steps:
   (1) Splitting a program into at least two parts, respectively public and secret, the public part being suitable for execution on a first processing means, and the secret part being suitable for execution on a secure, second processing means;
   (2) Encoding at least the secret part and placing it with the public part on the same medium, the latter being connectable to the first processing means;
   (3) Placing a corresponding decoding function on the second processing means comprising a portable chip medium that is connectable to and detachable from said first processing means:
   (4) Carrying out the following operations for the execution of the program:
      (a) connecting the second processing means to the first, and transmission, from the first processing means to the second, of all or a portion of the encoded secret part,
      (b) decoding the said encoded secret part received by the second, secure processing means by making use of said decoding function, and storing the decoded secret part in secure memory,
      (c) transmission from the first processing means to the second of parameters/variables which are functions of external signals,
      (d) execution of at least said secret part by the second, secure processing means, using said received parameters/variables,
      (e) transmission of the results of the execution of the preceding paragraph (d) from the second processing means to the first, and
      (f) using said results in the execution effected by the first means.

7. Process according to claim 6, wherein, in the operation (a), a portion of the encoded program is transmitted to the extent needed and/or as a function of the capacity of the second, secure processing means.

8. Process according to claim 6, wherein a secure distribution is effected of utilization rights of the said program to a medium of a user via a server.

9. Process according to claim 8, wherein said medium sends to a server a request for loading rights, containing the identity of the program and an identity of the medium, said server combines an identity of the requester's medium with a rights encoding key, the result being a number of bits suitable for use as a diversified encoding key, the server uses this diversified key to encode the requested rights, and sends the thus encoded rights to the requester's medium.

10. Process according to claim 6, wherein the second processing means is a card having a microprocessor.

11. Process according to claim 6, wherein the second processing means is in a hardwired form on a memory card.

12. Process according to claim 6, wherein the first processing means is a central processing unit of a computer.

* * * * *